United States Patent
Frasher et al.

(10) Patent No.: US 11,305,674 B2
(45) Date of Patent: *Apr. 19, 2022

(54) SEAT-BASED FORCE NULLIFICATION SYSTEMS AND METHODS FOR SEATED VEHICLE OCCUPANTS

(71) Applicant: Volvo Car Corporation, Gothenburg (SE)

(72) Inventors: Douglas Hall Frasher, Newbury Park, CA (US); Lawrence E. Abele, Camarillo, CA (US)

(73) Assignee: Volvo Car Corporation, Gothenburg (SE)

( * ) Notice: Subject to any disclaimer, the term of this patent is extended or adjusted under 35 U.S.C. 154(b) by 189 days.

This patent is subject to a terminal disclaimer.

(21) Appl. No.: 16/013,176

(22) Filed: Jun. 20, 2018

(65) Prior Publication Data

US 2019/0389342 A1 Dec. 26, 2019

(51) Int. Cl.
*B60N 2/50* (2006.01)
*B60G 17/018* (2006.01)
(Continued)

(52) U.S. Cl.
CPC .......... *B60N 2/501* (2013.01); *B60G 17/018* (2013.01); *B60G 17/019* (2013.01); *B60G 17/0162* (2013.01)

(58) Field of Classification Search
CPC .............. B60G 17/0162; B60G 17/018; B60G 17/01908; B60N 2/501
See application file for complete search history.

(56) References Cited

U.S. PATENT DOCUMENTS 5,979,827 A 11/1999 Corcoran
6,398,293 B1 * 6/2002 Nystrom .................. B60N 2/39
180/89.14
(Continued)

FOREIGN PATENT DOCUMENTS

DE 4201412 A1 7/1993
DE 102004058503 A1 1/2006
(Continued)

OTHER PUBLICATIONS

Extended European Search report dated International Application No. 19180631.

*Primary Examiner* — Faye M Fleming
(74) *Attorney, Agent, or Firm* — Clements Bernard Walker; Christopher L. Bernard

(57) ABSTRACT

System and methods for nullifying one or more of lateral and longitudinal acceleration forces experienced by an occupant of a vehicle in a seated or standing position while the vehicle is traveling along a travel plane, including: a chassis structure; an occupant cell one of coupled to and defined by the chassis structure; and one or more of a seat assembly configured to receive the occupant in a seated position and a standing platform assembly configured to receive the occupant in a standing position disposed within the occupant cell; wherein the one or more of the seat assembly and the standing platform assembly is/are configured to pivot one or more of: laterally at a longitudinal pivot point with respect to the chassis and travel plane; and longitudinally at a transverse pivot point with respect to the chassis and travel plane.

20 Claims, 9 Drawing Sheets

(51) Int. Cl.
  *B60G 17/019* (2006.01)
  *B60G 17/016* (2006.01)

(56) References Cited

U.S. PATENT DOCUMENTS

| | | | |
|---|---|---|---|
| 6,755,270 B2 * | 6/2004 | Saarinen | B60N 2/14 |
| | | | 180/89.13 |
| 7,063,334 B2 | 6/2006 | Lim | |
| 8,240,758 B2 | 8/2012 | Combest | |
| 8,360,368 B2 * | 1/2013 | Bertrand | B64G 1/60 |
| | | | 244/171.9 |
| 9,321,321 B2 * | 4/2016 | Koumura | B60G 17/0161 |
| 9,783,086 B2 * | 10/2017 | Parker | B60N 2/39 |
| 9,981,522 B2 * | 5/2018 | Kolb | B60G 15/12 |
| 10,926,600 B2 * | 2/2021 | Frasher | B60G 17/01908 |
| 2014/0019011 A1 | 1/2014 | Löfstrand | |
| 2018/0057050 A1 * | 3/2018 | Takenaka | B62D 6/002 |
| 2018/0237065 A1 * | 8/2018 | Yamamoto | B60K 1/00 |
| 2018/0265158 A1 * | 9/2018 | Hara | B62K 5/08 |
| 2018/0290684 A1 * | 10/2018 | Suda | B62D 9/04 |
| 2019/0184867 A1 * | 6/2019 | Ketels | B60N 2/501 |

FOREIGN PATENT DOCUMENTS

| | | |
|---|---|---|
| DE | 102007023283 A1 | 11/2008 |
| EP | 1090568 A2 | 4/2001 |
| JP | S6187135 U | 6/1986 |

\* cited by examiner

SEAT-BASED FORCE NULLIFICATION SYSTEMS AND METHODS FOR SEATED VEHICLE OCCUPANTS

FIELD OF THE DISCLOSURE

The present disclosure relates generally to seat-based force nullification systems and methods for seated vehicle occupants. More specifically, the present disclosure relates to seat-based force nullification systems and methods for seated vehicle occupants that allow the seat of a vehicle to pivot laterally and/or longitudinally within the chassis and passenger compartment of the vehicle with respect to a travel plane, such as a road surface or the like, as the vehicle subjects the occupant to lateral, longitudinal, and/or vertical forces. These systems and methods may be passive or active and provide enhanced occupant comfort during vehicular maneuvers, such as curve navigation, hill cresting, and the like, in both driver assist and autonomous applications. The systems and methods may be extended conceptually to standing occupants as well, with the pivoting seat being replaced by a pivoting standing platform or the like.

BACKGROUND OF THE DISCLOSURE

A vehicle negotiating a roadway, for example, subjects the vehicle occupant to lateral, longitudinal, and/or vertical acceleration forces. These forces require the occupant to utilize his or her muscles to retain his or her upright posture, potentially resulting in discomfort and/or fatigue over time. Conventional vehicles designed primarily to maintain occupant comfort typically limit lateral and longitudinal accelerations to a maximum of about 0.3 g, allowing them to maintain safe and comfortable driving behavior relative to the surrounding environment and traffic. This is especially true of vehicles operating autonomously. Within this limit, the rigid chassis, passenger compartment, and seating system are designed to allow the occupant to passively achieve a lean angle that balances lateral and/or longitudinal forces while negotiating a curve or hill, for example. Vertical forces are typically accommodated by a conventional restraint system and passive and/or active suspension systems, well known to those of ordinary skill in the art.

What are still needed in the art, however, are systems and methods that proactively nullify even these lower lateral and longitudinal accelerations such that occupant comfort is further enhanced. Such seat-based force nullification systems and methods are provided by the present disclosure and may operate in a passive or active manner.

BRIEF SUMMARY OF THE DISCLOSURE

In various exemplary embodiments, the present disclosure provides seat-based force nullification systems and methods for seated vehicle occupants that allow the vehicle seat to pivot laterally and/or longitudinally within the chassis and passenger compartment of the vehicle with respect to a travel plane, such as a road surface or the like, as the vehicle subjects the occupant to lateral, longitudinal, and/or vertical forces. These systems and methods may be extended conceptually to standing occupants as well, with the pivoting seat being replaced by a pivoting standing platform or the like. The systems and methods utilize gravity to, in part, nullify lateral and/or longitudinal occupant accelerations, moving them to intermediate planes between pure lateral and/or longitudinal and pure vertical. Related to lateral acceleration, the systems and methods allow the occupant, through the pivoting seat or standing platform, to rotate about a longitudinal pivot such that a resultant of the lateral and gravitational forces aligns with a line drawn between the virtual longitudinal pivot point and the center of mass of the rotatable body. Related to longitudinal acceleration, the systems and methods allow the occupant, again through the pivoting seat or standing platform, to rotate about a transverse pivot such that a resultant of the longitudinal and gravitational forces aligns with a line drawn between the virtual transverse pivot point and the center of mass of the rotatable body. Vertical acceleration is dealt with via conventional restraint and passive and/or active suspension system principles, well known to those of ordinary skill in the art.

Although primarily road vehicles (such as cars, trucks, and the like) are used as illustrative examples herein, it will be readily apparent to those of ordinary skill in the art that the systems and methods of the present disclosure are equally applicable to marine, air, space, and other vehicle systems in the broadest sense.

In one exemplary embodiment, the present disclosure provides a system for nullifying one or more of lateral and longitudinal acceleration forces experienced by an occupant of a vehicle in a seated or standing position while the vehicle is traveling along a travel plane, the system including: a chassis structure; an occupant cell one of coupled to and defined by the chassis structure; and one or more of a seat assembly configured to receive the occupant in a seated position and a standing platform assembly configured to receive the occupant in a standing position disposed within the occupant cell; wherein the one or more of the seat assembly and the standing platform assembly is/are configured to pivot one or more of: laterally at a longitudinal pivot point with respect to the chassis and travel plane; and longitudinally at a transverse pivot point with respect to the chassis and travel plane. The seat assembly includes: a seat structure including a seat pan; and one or more of: an arcuate lateral slider mechanism disposed in a transverse orientation below and coupled to the seat pan, the arcuate lateral slider member operable for pivoting the seat pan laterally about the longitudinal pivot point; and an arcuate longitudinal slider mechanism disposed in a longitudinal orientation below and coupled to the seat pan, the arcuate longitudinal slider member operable for pivoting the seat pan longitudinally about the transverse pivot point. The standing platform assembly includes: a standing platform structure including a foot support; and one or more of: an arcuate lateral slider mechanism disposed in a transverse orientation below and coupled to the foot support, the arcuate lateral slider member operable for pivoting the foot support laterally about the longitudinal pivot point; and an arcuate longitudinal slider mechanism disposed in a longitudinal orientation below and coupled to the foot support, the arcuate longitudinal slider member operable for pivoting the foot support longitudinally about the transverse pivot point. The one or more of the seat assembly and the standing platform assembly are configured to pivot one or more of laterally and longitudinally within ±17 degrees from a perpendicular plane with respect to the chassis and travel plane. Optionally, the longitudinal pivot point and the transverse pivot point are virtual pivot points. The longitudinal pivot point and the transverse pivot point are disposed substantially above a combined center of gravity of the occupant and the one or more of the seat assembly and the standing platform assembly. Optionally, the one or more of the seat assembly and the standing platform assembly are configured to pivot one or more of laterally and longitudinally without active assistance. Alternatively, the one or more of the seat assembly and the standing platform assembly are configured to pivot one or more of laterally and longitudinally with active assistance of one or more actuation mechanisms coupled to one or more controllers responsive to feedback from one or more sensors. Alternatively, the one or more of the seat assembly and the standing platform assembly are configured to pivot one or more of laterally and longitudinally with active assistance of one or more actuation mechanisms coupled to one or more controllers responsive to feedback from one or more cameras.

In another exemplary embodiment, the present disclosure provides a method for nullifying one or more of lateral and longitudinal acceleration forces experienced by an occupant of a vehicle in a seated or standing position while the vehicle is traveling along a travel plane, the method including: providing a chassis structure; providing an occupant cell one of coupled to and defined by the chassis structure; providing one or more of a seat assembly configured to receive the occupant in a seated position and a standing platform assembly configured to receive the occupant in a standing position disposed within the occupant cell; wherein the one or more of the seat assembly and the standing platform assembly is/are configured to pivot one or more of: laterally at a longitudinal pivot point with respect to the chassis and travel plane; and longitudinally at a transverse pivot point with respect to the chassis and travel plane; and pivoting the one or more of the seat assembly and the standing platform assembly one or more of laterally about the longitudinal pivot point and longitudinally about the transverse pivot point as the vehicle travels along the travel plane. The seat assembly includes: a seat structure including a seat pan; and one or more of: an arcuate lateral slider mechanism disposed in a transverse orientation below and coupled to the seat pan, the arcuate lateral slider member operable for pivoting the seat pan laterally about the longitudinal pivot point; and an arcuate longitudinal slider mechanism disposed in a longitudinal orientation below and coupled to the seat pan, the arcuate longitudinal slider member operable for pivoting the seat pan longitudinally about the transverse pivot point. The standing platform assembly includes: a standing platform structure including a foot support; and one or more of: an arcuate lateral slider mechanism disposed in a transverse orientation below and coupled to the foot support, the arcuate lateral slider member operable for pivoting the foot support laterally about the longitudinal pivot point; and an arcuate longitudinal slider mechanism disposed in a longitudinal orientation below and coupled to the foot support, the arcuate longitudinal slider member operable for pivoting the foot support longitudinally about the transverse pivot point. The one or more of the seat assembly and the standing platform assembly are configured to pivot one or more of laterally and longitudinally within ±17 degrees from a perpendicular plane with respect to the chassis and travel plane. Optionally, the longitudinal pivot point and the transverse pivot point are virtual pivot points. The longitudinal pivot point and the transverse pivot point are disposed substantially above a combined center of gravity of the occupant and the one or more of the seat assembly and the standing platform assembly. Optionally, the one or more of the seat assembly and the standing platform assembly are configured to pivot one or more of laterally and longitudinally without active assistance. Alternatively, the one or more of the seat assembly and the standing platform assembly are configured to pivot one or more of laterally and longitudinally with active assistance of one or more actuation mechanisms coupled to one or more controllers responsive to feedback from one or more sensors. Alternatively, the one or more of the seat assembly and the standing platform assembly are configured to pivot one or more of laterally and longitudinally with active assistance of one or more actuation mechanisms coupled to one or more controllers responsive to feedback from one or more cameras.

In a further exemplary embodiment, the present disclosure provides a seat assembly for nullifying one or more of lateral and longitudinal acceleration forces experienced by an occupant of a vehicle in a seated position while the vehicle is traveling along a travel plane, the seat assembly including: a seat structure including a seat pan; and one or more of: an arcuate lateral slider mechanism disposed in a transverse orientation below and coupled to the seat pan, the arcuate lateral slider member operable for pivoting the seat pan laterally about a longitudinal pivot point; and an arcuate longitudinal slider mechanism disposed in a longitudinal orientation below and coupled to the seat pan, the arcuate longitudinal slider member operable for pivoting the seat pan longitudinally about a transverse pivot point. The seat structure further includes a seat back coupled to the seat pan.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
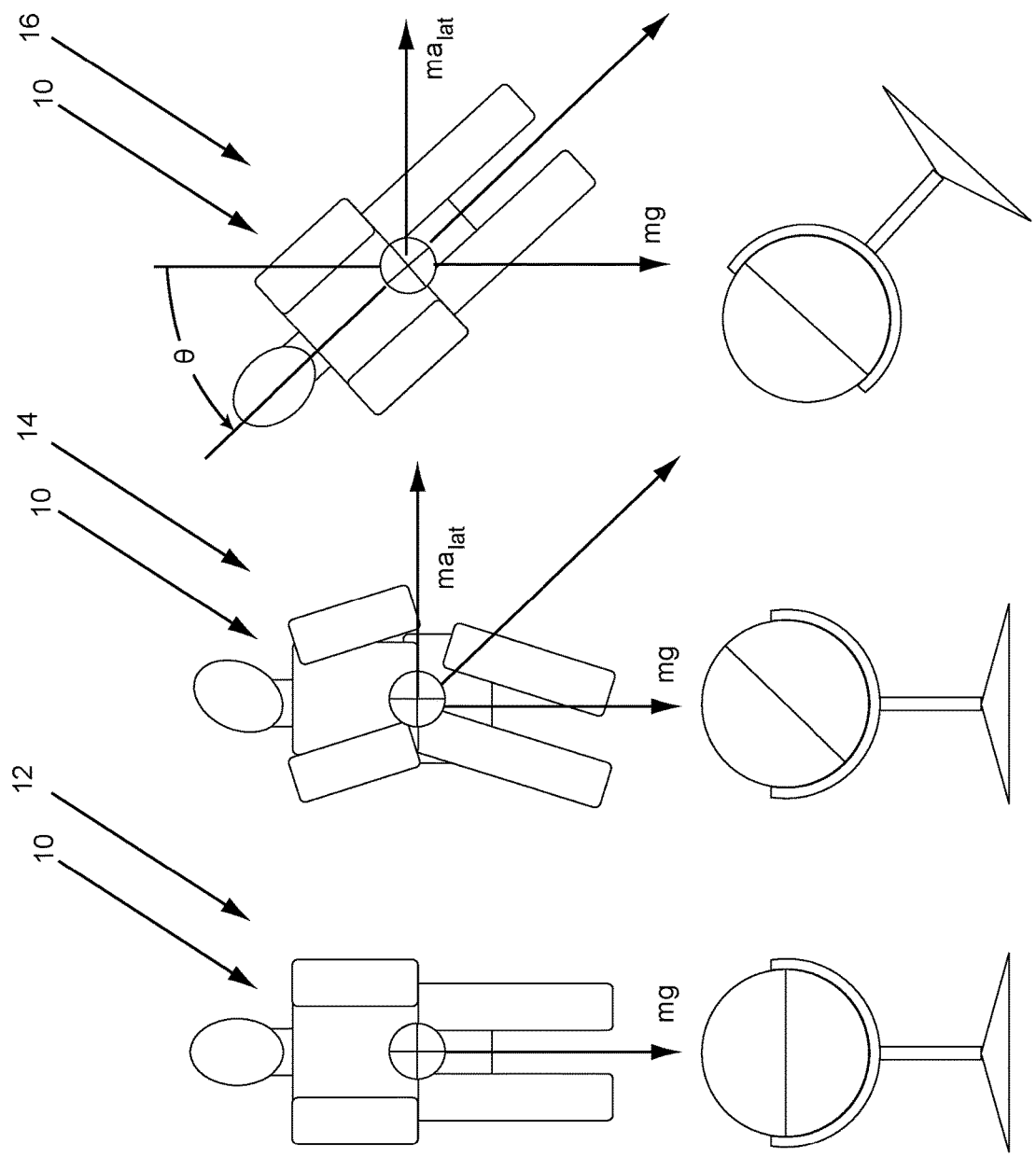
FIG. 1 is a schematic diagram illustrating the effect of lateral acceleration on a vehicle occupant and the operational principle of the present disclosure.

Referring now specifically to FIG. 1, a vehicle occupant 10 is illustrated experiencing no lateral acceleration 12, experiencing 1 g of lateral acceleration 14, and experiencing 1 g of lateral acceleration as nullified by the systems and methods of the present disclosure 16. With no lateral acceleration 12, only a vertical gravity force is present and acts upon the occupant 10, which the occupant 10 feels through his or her seating surface, if seated, or feet, if standing. With 1 g lateral acceleration 14, both a vertical gravity force and lateral acceleration force are present and act upon the occupant 10, both of which the occupant 10 feels through his or her seating surface, if seated, or feet, if standing, and through his or her posture-support muscles. The resultant force experienced by the occupant 10 lies between the vertical gravity force and the lateral acceleration force. With 1 g lateral acceleration and nullification 16, both a vertical gravity force and lateral acceleration force are again present and act upon the occupant, both of which the occupant 10 would feel through his or her seating surface, if seated, or feet, if standing, and through his or her posture-support muscles. Again, the resultant force experienced by the occupant 10 would lie between the vertical gravity force and the lateral acceleration force. However, the occupant 10 is allowed to pivot and lean at an angle, θ, such that his or her posture-support muscles are not taxed. The occupant 10 feels "heavier," but does not feel conventional side forces as a vehicle navigates a curve, for example. This is the same principle implicated by a leaning bicyclist or motorcycle rider. It is also the same principle that prevents a vehicle from sliding down a steeply banked curve. Lateral acceleration is negated, in part, using gravity.

Figure 2:
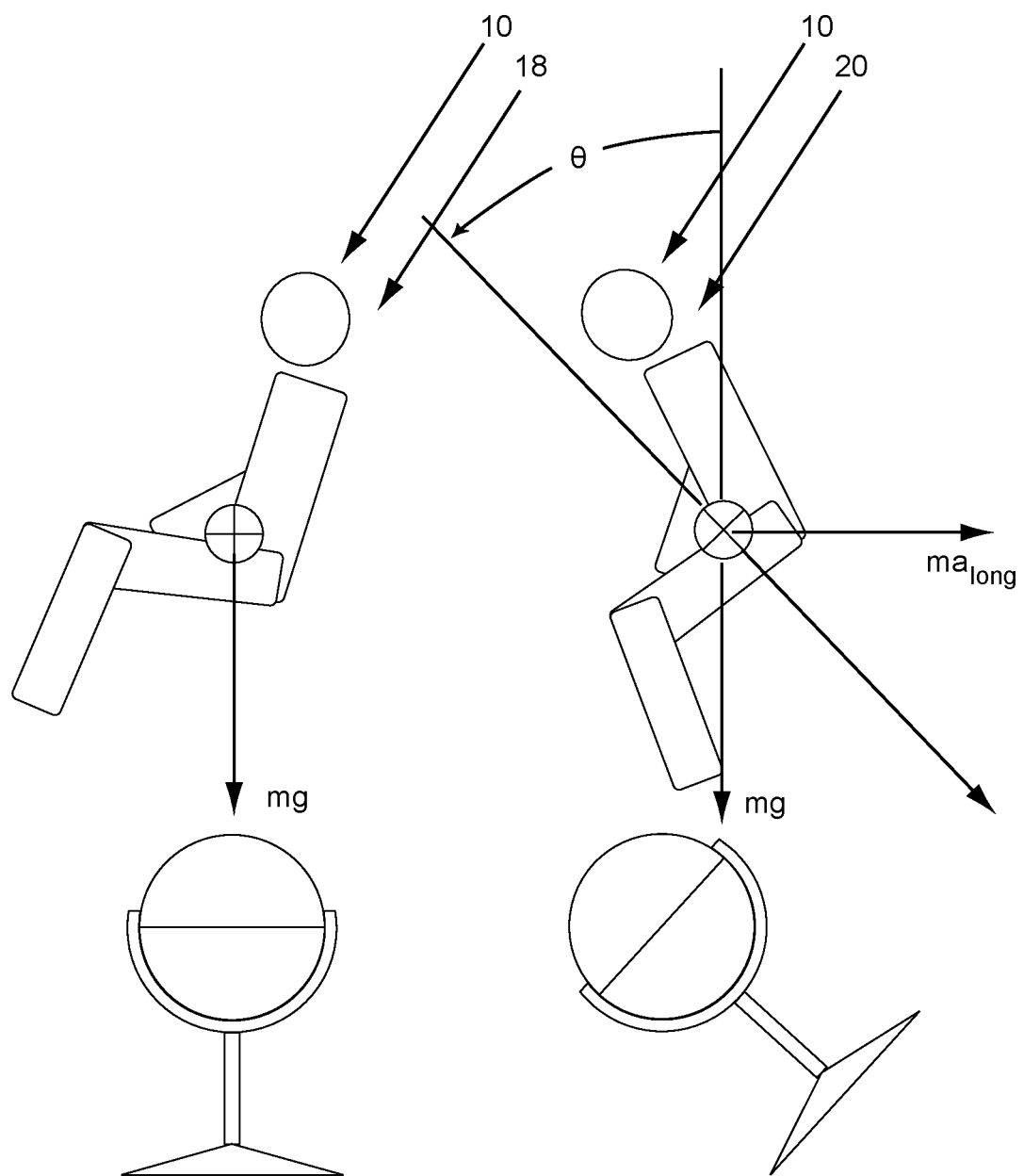
FIG. 2 is a schematic diagram illustrating the effect of longitudinal acceleration on a vehicle occupant and the operational principle of the present disclosure.

Referring now specifically to FIG. 2, a vehicle occupant 10 is illustrated experiencing no longitudinal acceleration 18 and experiencing 1 g of longitudinal acceleration as optionally nullified by the systems and methods of the present disclosure 20. With no longitudinal acceleration 18, only a vertical gravity force is present and acts upon the occupant 10, which the occupant 10 feels through his or her seating surface, if seated, or feet, if standing. With 1 g longitudinal acceleration 20, both a vertical gravity force and longitudinal acceleration force are present and act upon the occupant, both of which the occupant 10 would feel through his or her seating surface, if seated, or feet, if standing, and through his or her posture-support muscles. The resultant force experienced by the occupant 10 would lie between the vertical gravity force and the longitudinal acceleration force. However, the occupant 10 is allowed to pivot and lean at an angle, θ, such that his or her posture-support muscles are not taxed. The occupant 10 feels "heavier," but does not feel conventional pitch forces as a vehicle navigates a hill crest, for example. Longitudinal acceleration is negated, in part, using gravity.

Figure 3:
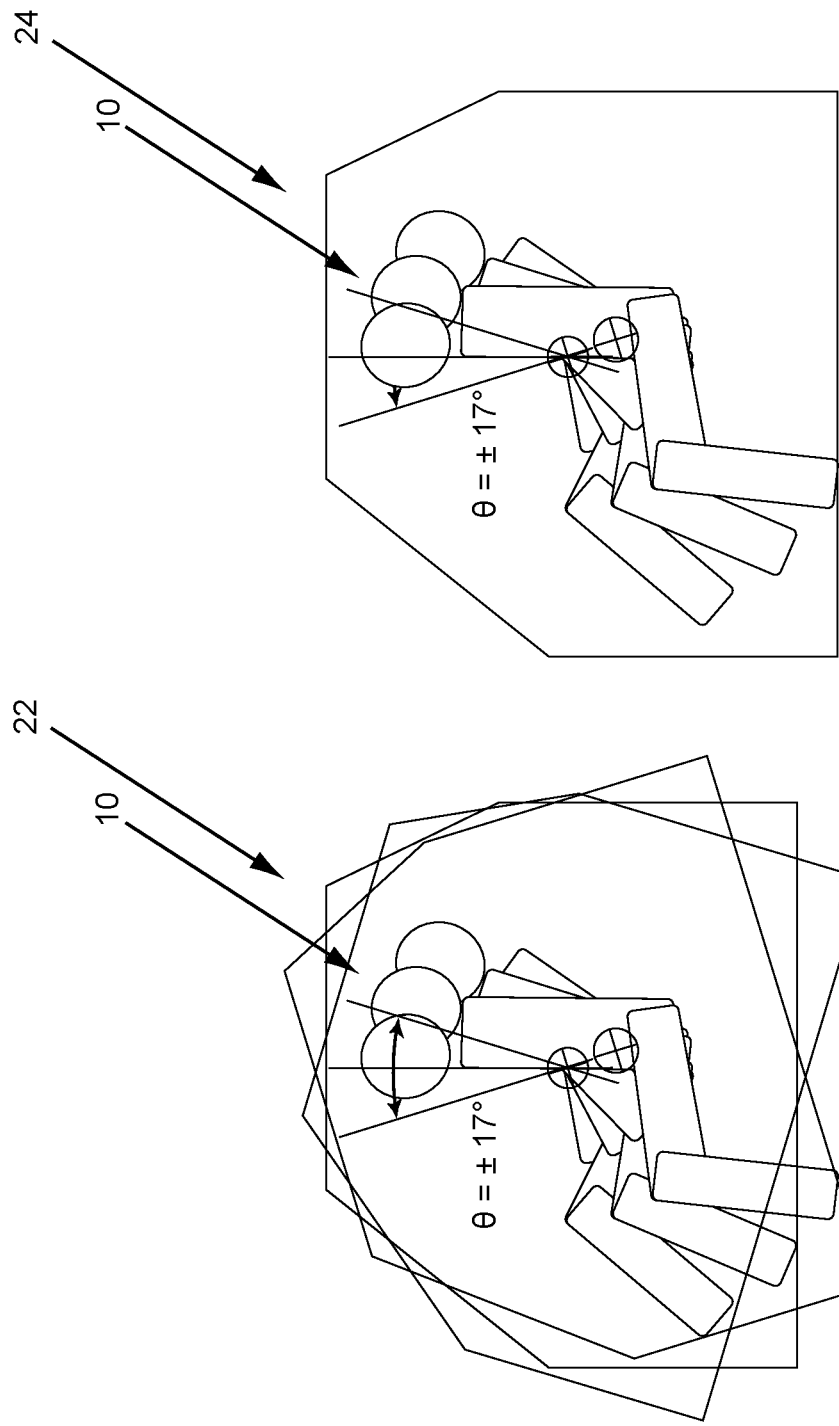
FIG. 3 is another schematic diagram illustrating the effect of longitudinal acceleration on a vehicle occupant and the operational principle of the present disclosure.

Referring now specifically to FIG. 3, as comfortable driving generates a maximum occupant longitudinal acceleration (for example) of 0.3 g, a useful maximum tilt angle is within about ±17 degrees. This rotation may be imparted to the occupant 10 through the occupant cell and/or chassis 22 (not described herein), or through the occupant seat or standing platform 24 (as described in greater detail herein). These configurations each present unique technical challenges.

Figure 4:
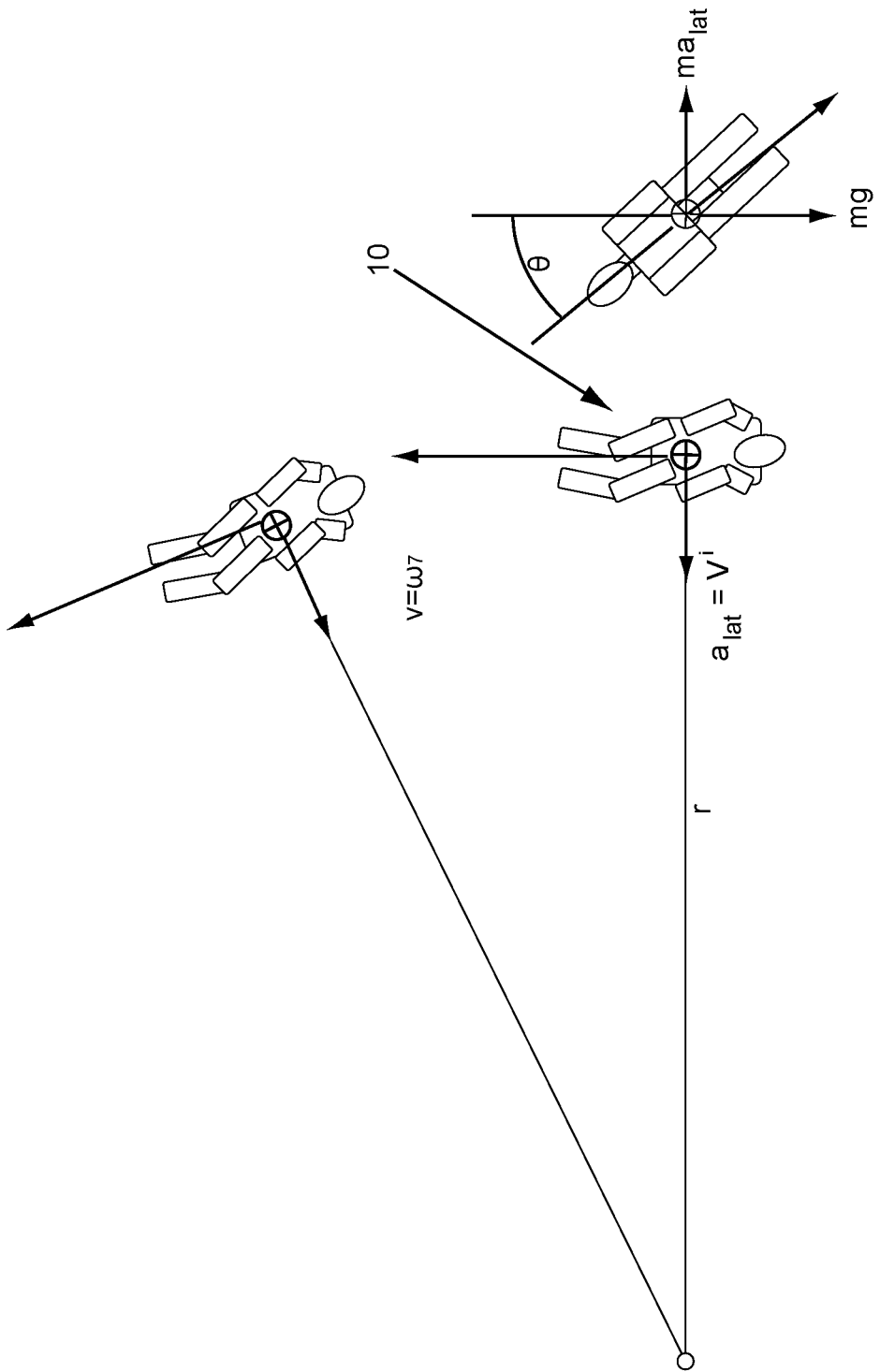
FIG. 4 is a schematic diagram illustrating the calculation of an optimal maximum occupant lateral and/or longitudinal lean angle for comfortable driving in accordance with the systems and methods of the present disclosure.

FIG. 4 illustrates the calculation of an optimal maximum occupant lateral (and/or longitudinal) lean angle, θ, for comfortable driving in accordance with the g-force nullifying systems and methods of the present disclosure.

$$\text{Lean Angle } \theta(\text{deg}) = 180/\pi * \tan^{-1}(ma_{lat}/mg) = 180/\pi * \tan^{-1}(a_{lat}/g) \quad (1)$$

This figure shows approximately 1 g of lateral acceleration, giving a lean angle of 45 degrees. This would be required if the goal was related to achieving maximum cornering speed. The goal, however, is typically to achieve maximum comfort. Comfortable driving generates an approximate maximum lateral acceleration of 3.0 m/s². This gives a lean angle of:

$$\theta = \frac{180}{\pi} * \tan^{-1}\left(\frac{3.0}{9.81}\right) = 16.7 \text{ degrees.} \quad (2)$$

Figure 5:
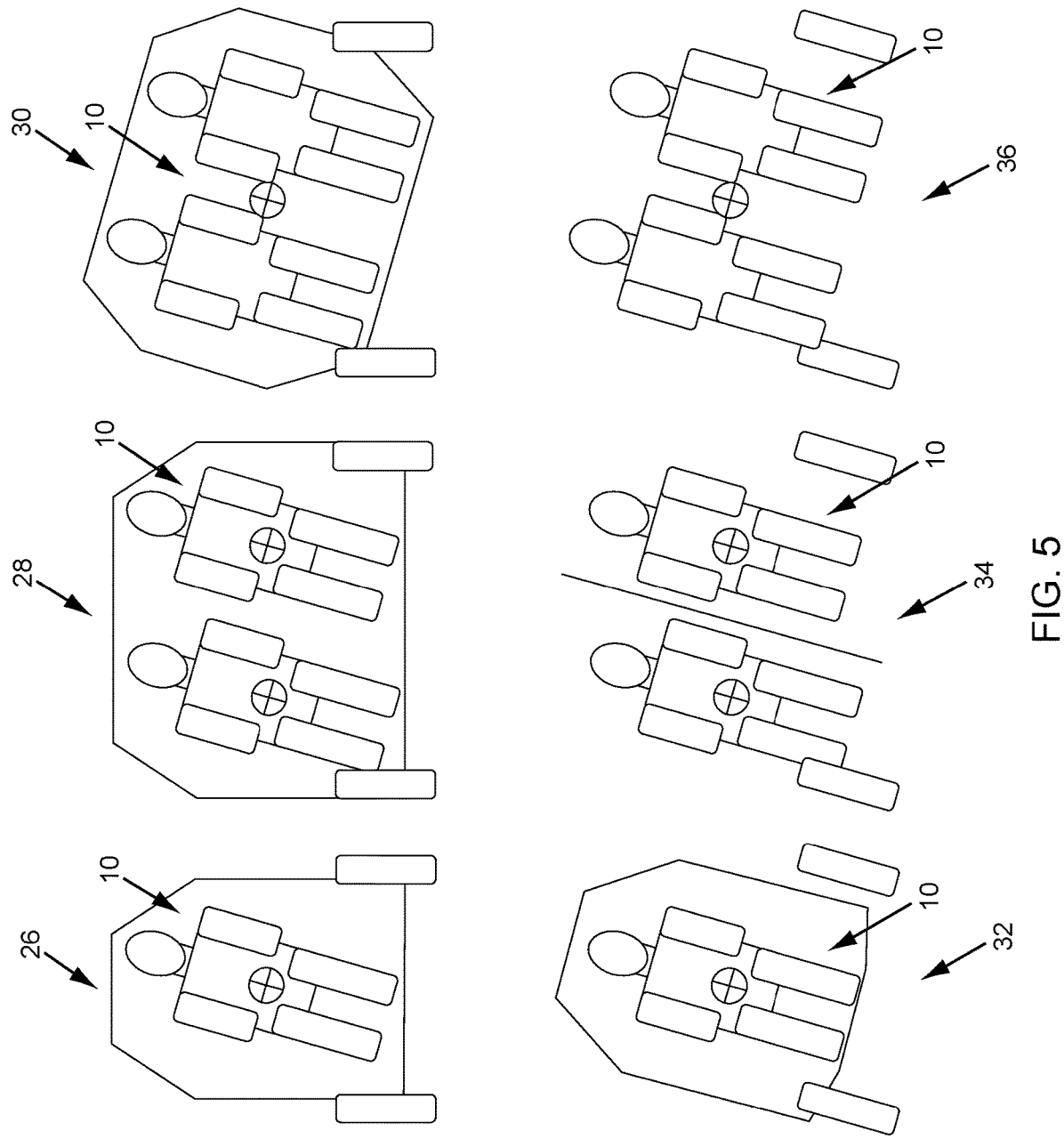
FIG. 5 is a schematic diagram illustrating a plurality of schemes for providing g-force nullifying lateral and/or longitudinal lean in accordance with the systems and methods of the present disclosure.

Referring now specifically to FIG. 5, there are several configurations that may be utilized to provide desired occupant lean, laterally, for example. Some of the same principles apply to longitudinal lean as well. The first and second configurations 26 and 28 lean the occupants 10 individually within the passenger compartment of a conventional chassis or the like, without correspondingly leaning the chassis. No significant benefit to tire load is provided. These configurations are not addressed in detail herein. The third configuration 30 leans the occupants 10 collectively within the passenger compartment of a conventional chassis or the like, without correspondingly leaning the chassis, such as by leaning the occupant cell or the like. Again, no significant to tire load is provided and imbalance difficulties may be encountered. The fourth configuration 32 leans the occupant 10 by leaning the chassis and/or the occupant cell. As the tires lean as well, tire load benefit is provided. The fifth configuration 34 leans the occupants 10 by leaning the chassis and/or the occupant cell. As the tires lean as well, tire load benefit is again provided. Here, however, to save space, the occupants 10 are allowed some vertical movement relative to one another, introducing some design and implementation complexity. The sixth configuration 36 leans the occupants 10 by leaning the chassis and/or the occupant cell. As the tires lean as well, tire load benefit is again provided. Here, however, the occupants 10 are allowed no vertical movement relative to one another, requiring extra space and introducing some imbalance concerns.

Figure 6:
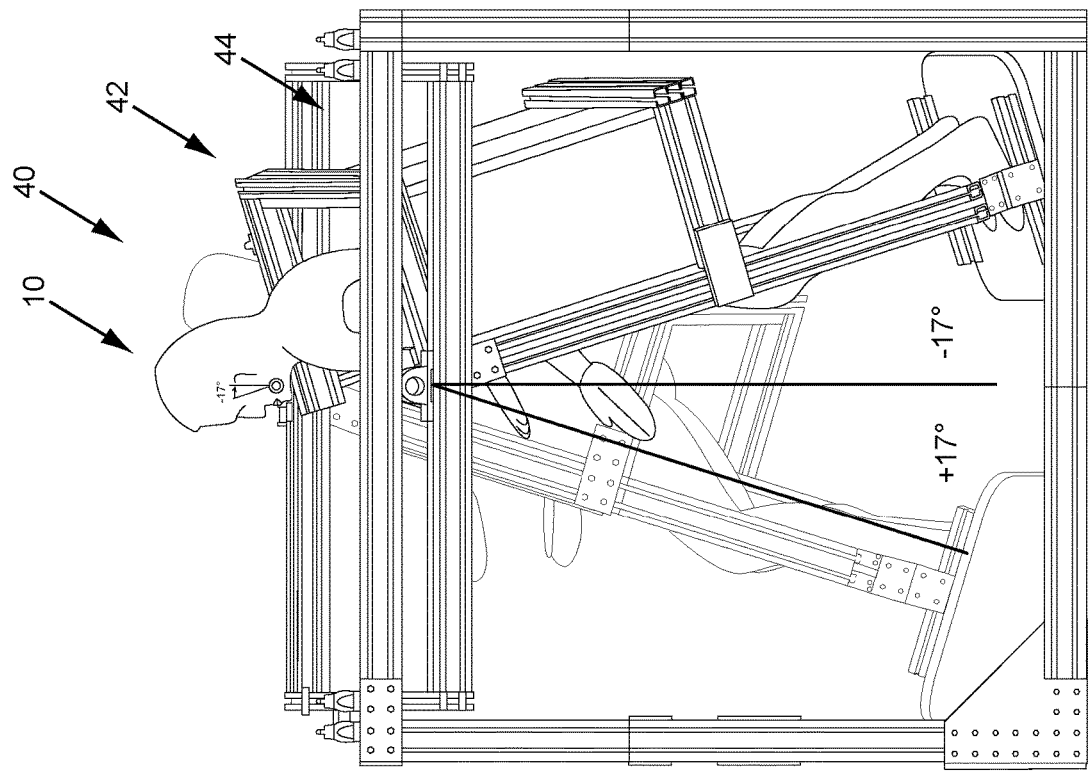
FIG. 6 is a series of perspective views of lateral and longitudinal test rigs demonstrating the operation of the concepts of the present disclosure.
Figure 6:
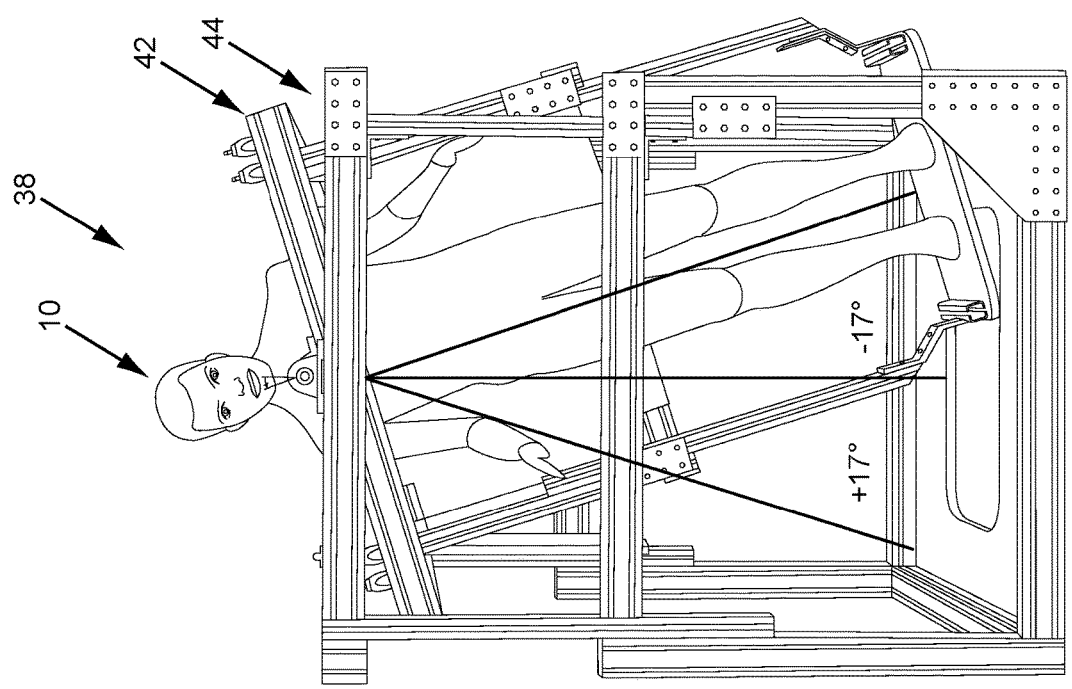

FIG. 6 is a series of perspective views of lateral and longitudinal test rigs 38 and 40 demonstrating the operation of the concepts of the present disclosure. In both test rigs 38 and 40, the occupant cell 42 and/or chassis 44 is/are allowed to pivot up to ±17 degrees, correspondingly pivoting the occupant 10, laterally and/or longitudinally. In both directions, the center of rotation should be above the center of mass for the rotating body in order to enable passive rotation. This effectively creates a pendulum. The motion of the pendulum is well behaved if it finds equilibrium immediately in response to the lateral force/longitudinal force without overshoot or undershoot. Inertial effects and friction affect this behavior. Experiments suggest that the moment of inertia of a human body combined with a seat, for example, tend to give stable good behavior with pivot locations somewhere between 20-100 mm above the center of gravity. Some friction can be tolerated, but ideally is minimal. In many embodiments, that the lean provided is active lean, triggered by motion sensors or cameras that sense vehicle motion and implemented by a control system and servo mechanisms.

Again, in various exemplary embodiments, the present disclosure provides seat-based force nullification systems and methods for seated vehicle occupants that allow the vehicle seat to pivot laterally and/or longitudinally within the chassis and passenger compartment of the vehicle with respect to a travel plane, such as a road surface or the like, as the vehicle subjects the occupant to lateral, longitudinal, and/or vertical forces. These systems and methods may be extended conceptually to standing occupants as well, with the pivoting seat being replaced by a pivoting standing platform or the like. The systems and methods utilize gravity to, in part, nullify lateral and/or longitudinal occupant accelerations, moving them to intermediate planes between pure lateral and/or longitudinal and pure vertical. Related to lateral acceleration, the systems and methods allow the occupant, through the pivoting seat or standing platform, to rotate about a longitudinal pivot such that a resultant of the lateral and gravitational forces aligns with a line drawn between the virtual longitudinal pivot point and the center of mass of the rotatable body. Related to longitudinal acceleration, the systems and methods allow the occupant, again through the pivoting seat or standing platform, to rotate about a transverse pivot such that a resultant of the longitudinal and gravitational forces aligns with a line drawn between the virtual transverse pivot point and the center of mass of the rotatable body. Vertical acceleration is dealt with via conventional restraint and passive and/or active suspension system principles, well known to those of ordinary skill in the art.

Although primarily road vehicles (such as cars, trucks, and the like) are used as illustrative examples herein, it will be readily apparent to those of ordinary skill in the art that the systems and methods of the present disclosure are equally applicable to marine, air, space, and other vehicle systems in the broadest sense.

Figure 7:
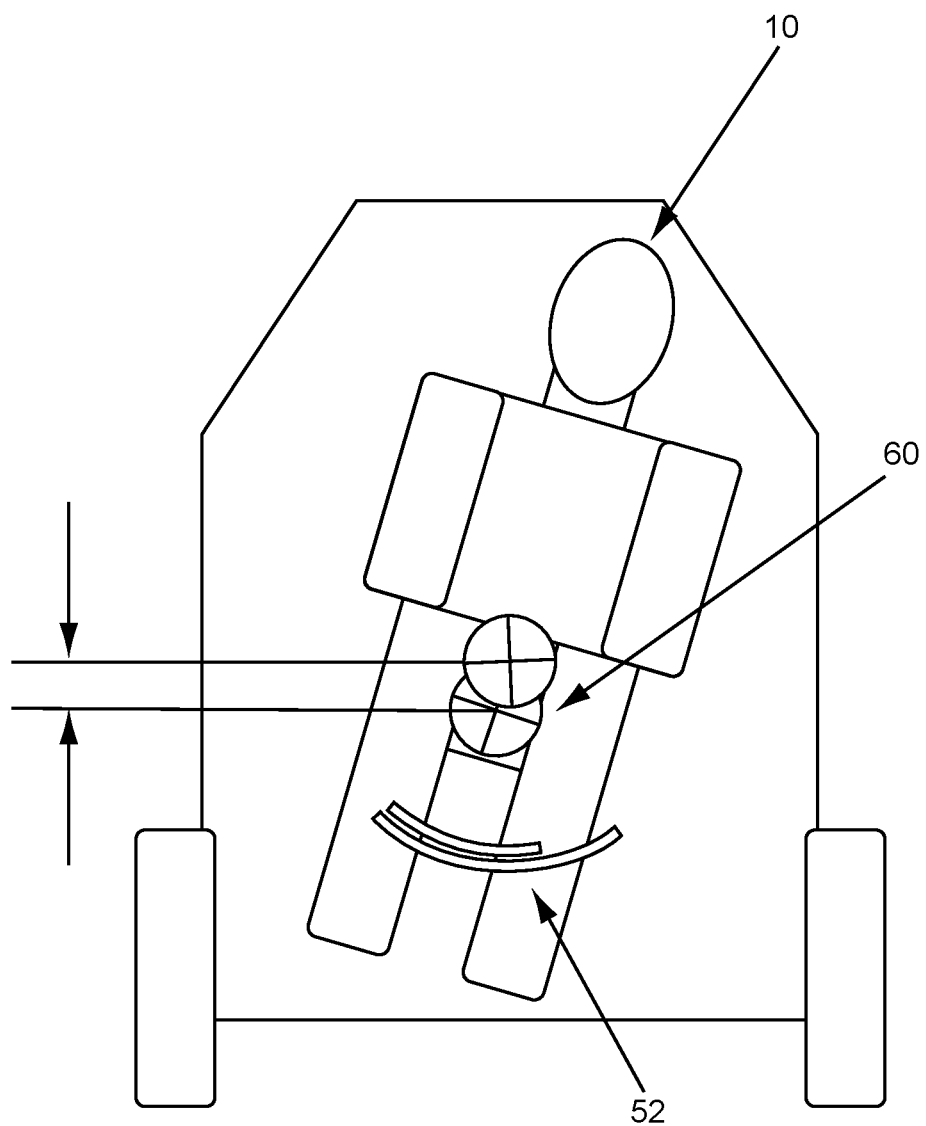
FIG. 7 is a schematic diagram illustrating one exemplary embodiment of the seat or standing platform-based force nullification system of the present disclosure.
Figure 8:
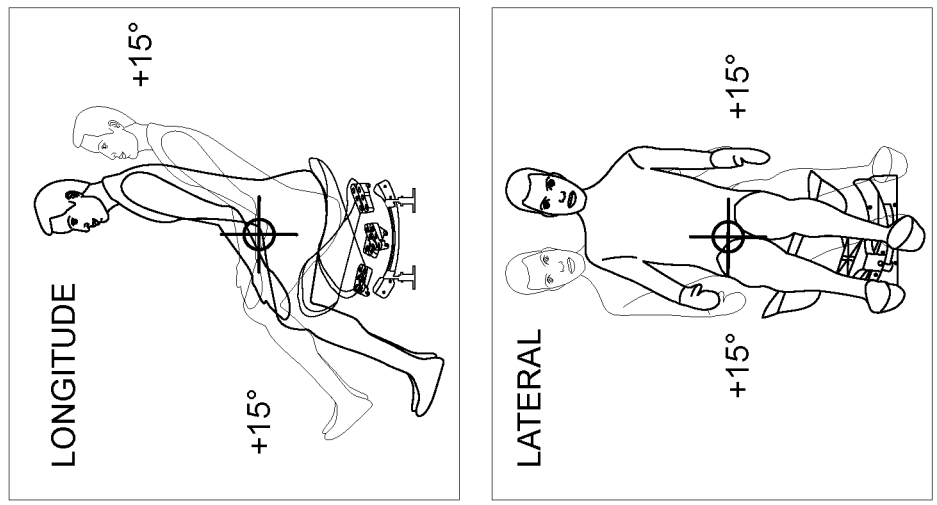
FIG. 8 is a series of views illustrating one exemplary embodiment of the seat-based force nullification system of the present disclosure, providing 15 degrees of pivot in both lateral and longitudinal planes.
Figure 8:
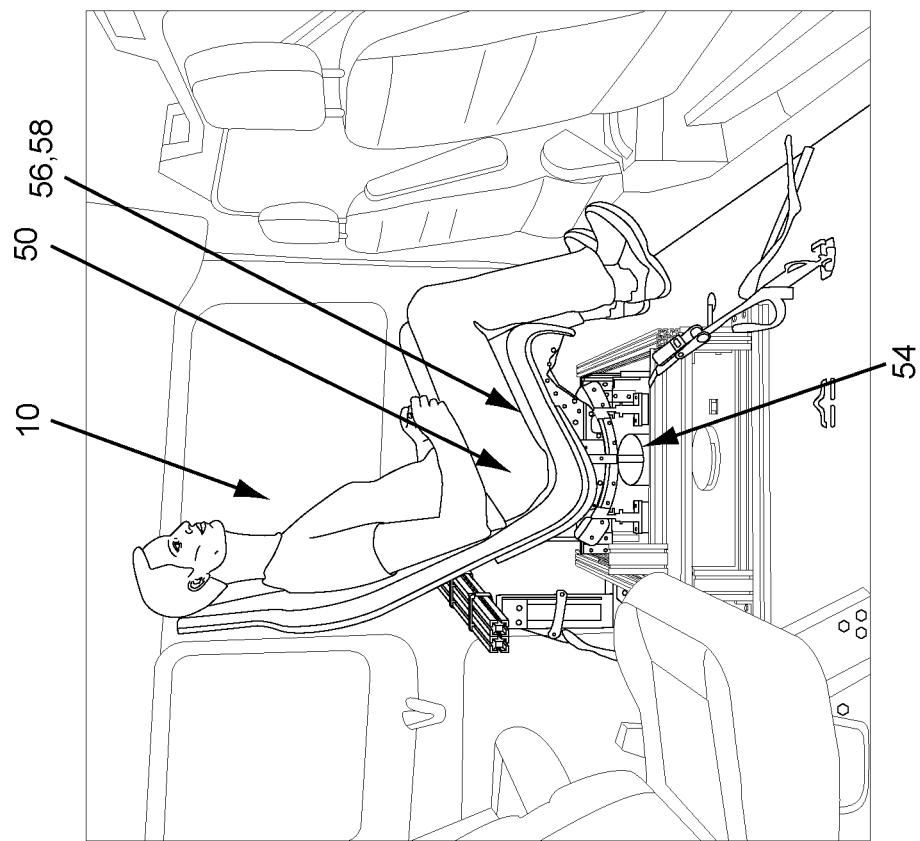

Referring now specifically to FIGS. 7 and 8, in one exemplary embodiment, a seat assembly 50 is provided that incorporates lateral and longitudinal sliding arc mechanisms 52 and 54 within its seat pan base 56 to allow for the rotation of the seat 58 and occupant 10 about longitudinal and transverse axes located some distance above the combined center of mass 60 of the seat 58 and occupant 10 to nullify lateral and longitudinal forces. A standing platform assembly (not specifically illustrated) including a floor (not specifically illustrated) would operate in the same manner. Each of the sliding arc mechanisms 52 and 54 includes stacked or nested tracks that translate with respect to one another via one or more bearing surfaces. It will be readily apparent to those of ordinary skill in the art that other suitable sliding or pivoting mechanisms may be used equally. Further, linear sliders may be used with appropriate ramp structures affixed to the bottom of the seat 58. The degrees of freedom provided allow the seat 58 and occupant 10 to assume an equilibrium position, such that the resultant force vectors of the force components and the gravity component are in line with a line drawn through the center of rotation and the center of mass. Nullification of the lateral forces from turning and the longitudinal forces from braking or accelerating is the result. Otherwise, the components of the seat 58 may be fairly conventional. This provides manufacturing advantages.

Figure 9:
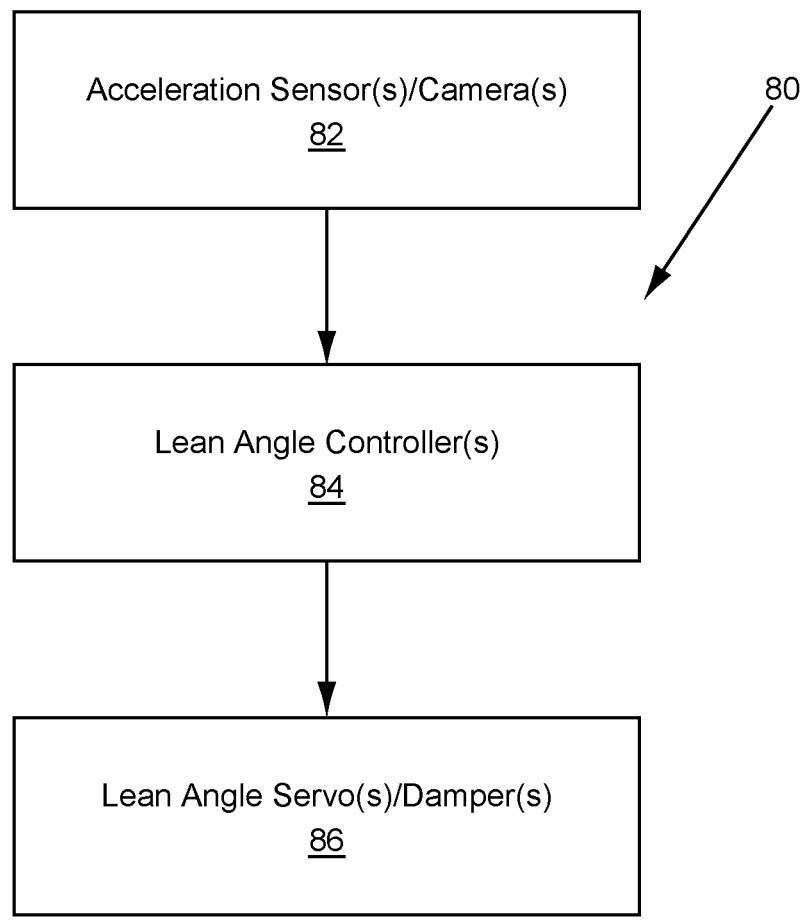
FIG. 9 is a schematic diagram illustrating one exemplary embodiment of a control system for the seat or standing platform-based force nullification system of the present disclosure.

Referring now specifically to FIG. 9, in several exemplary embodiments, control of this effect may be either passive, i.e. no control, or active, i.e. with some degree of control, over the motion. Accordingly, the coupled control system 80 may include required acceleration sensors and/or cameras 82, lean angle controllers 84, and lean angle servos and/or dampers 86 for detecting, controlling, and responding to the motion. For example, active control may be achieved with accelerometers 82 placed at locations through the respective pivoting axis line(s) and operate according to state-of-the-art closed-loop control system theory.

Passive control is always feasible and from testing it has been determined that the moment of inertia of a combined seat and human occupant, together with a carefully determined pivot location, can result in a reasonably well-behaved oscillation. A well-behaved oscillation for either lateral or longitudinal g-force nullification is one where the seat system and human occupant angle varies linearly with the g-force value and does not overshoot or undershoot the target equilibrium or g-force nullification angle.

It is likely that some degree of active control system is desirable in a commercialized product, although the design should be optimized to give the best passive result, so that the amount of work required by an additional control system is minimized. Thus, a system that maximizes occupant comfort by eliminating annoying forces due to vehicle braking, accelerating, and cornering maneuvers incorporating a seat/standing platform designed to nullify lateral and longitudinal forces is provided.

Preferably, the active control software application(s) of the present disclosure, when utilized, is/are implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, etc., as described herein.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

The active suspension alluded to herein for vertical motion control may include an active chassis with rear air suspension and "Four-C" technology. Providing comfort and handling advantages while automatically maintaining ride height, it allows a driver/occupant to adapt the chassis to his or her preferences. To ensure comfort and handling even if the vehicle is heavily loaded, the self-adapting air suspension for the rear wheels keeps the ride height constant. "Four-C" technology monitors the vehicle, road, and driver up to 500 times per second, simultaneously adjusting each shock absorber to current road and driving conditions to maximize both ride comfort and driving/riding pleasure. Three chassis settings allow the driver/occupant to adapt the suspension to his or her mood and current road conditions. In "Comfort" mode, the suspension is tuned for maximum comfort, while "Eco" mode optimizes the suspension for low fuel-consumption. "Dynamic" mode enhances the vehicle's sporty characteristics with firmer, more dynamic suspension.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system for nullifying one or more of lateral and longitudinal acceleration forces experienced by an occupant of a vehicle in a seated or standing position while the vehicle is traveling along a travel plane, the system comprising:
    a chassis structure;
    an occupant cell one of coupled to and defined by the chassis structure; and
    one or more of a seat assembly configured to receive the occupant in a seated position and a standing platform assembly configured to receive the occupant in a standing position disposed within the occupant cell;
    wherein the one or more of the seat assembly and the standing platform assembly is/are configured to pivot one or more of:
        laterally at a longitudinal pivot point with respect to the chassis and travel plane; and
        longitudinally at a transverse pivot point with respect to the chassis and travel plane; and
    wherein the longitudinal pivot point and the transverse pivot point are disposed substantially above a combined center of gravity of the occupant and the one or more of the seat assembly and the standing platform assembly.

2. The system of claim 1, wherein the seat assembly comprises:
    a seat structure comprising a seat pan; and
    one or more of:
        an arcuate lateral slider mechanism disposed in a transverse orientation below and coupled to the seat pan, the arcuate lateral slider member operable for pivoting the seat pan laterally about the longitudinal pivot point; and
        an arcuate longitudinal slider mechanism disposed in a longitudinal orientation below and coupled to the seat pan, the arcuate longitudinal slider member operable for pivoting the seat pan longitudinally about the transverse pivot point.

3. The system of claim 1, wherein the standing platform assembly comprises:
    a standing platform structure comprising a foot support; and
    one or more of:
        an arcuate lateral slider mechanism disposed in a transverse orientation below and coupled to the foot support, the arcuate lateral slider member operable for pivoting the foot support laterally about the longitudinal pivot point; and
        an arcuate longitudinal slider mechanism disposed in a longitudinal orientation below and coupled to the foot support, the arcuate longitudinal slider member operable for pivoting the foot support longitudinally about the transverse pivot point.

4. The system of claim 1, wherein the one or more of the seat assembly and the standing platform assembly are configured to pivot one or more of laterally and longitudinally within ±17 degrees from a perpendicular plane with respect to the chassis and travel plane.

5. The system of claim 1, wherein the longitudinal pivot point and the transverse pivot point are virtual pivot points.

6. The system of claim 1, wherein the one or more of the seat assembly and the standing platform assembly are configured to pivot one or more of laterally and longitudinally without active assistance.

7. The system of claim 1, wherein the one or more of the seat assembly and the standing platform assembly are configured to pivot one or more of laterally and longitudinally with active assistance of one or more actuation mechanisms coupled to one or more controllers responsive to feedback from one or more sensors.

8. The system of claim 1, wherein the one or more of the seat assembly and the standing platform assembly are configured to pivot one or more of laterally and longitudinally with active assistance of one or more actuation mechanisms coupled to one or more controllers responsive to feedback from one or more cameras.

9. A method for nullifying one or more of lateral and longitudinal acceleration forces experienced by an occupant of a vehicle in a seated or standing position while the vehicle is traveling along a travel plane, the method comprising:
    providing a chassis structure;
    providing an occupant cell one of coupled to and defined by the chassis structure;
    providing one or more of a seat assembly configured to receive the occupant in a seated position and a standing platform assembly configured to receive the occupant in a standing position disposed within the occupant cell;
    wherein the one or more of the seat assembly and the standing platform assembly is/are configured to pivot one or more of:
        laterally at a longitudinal pivot point with respect to the chassis and travel plane; and
        longitudinally at a transverse pivot point with respect to the chassis and travel plane;
    wherein the longitudinal pivot point and the transverse pivot point are disposed substantially above a combined center of gravity of the occupant and the one or more of the seat assembly and the standing platform assembly; and
    pivoting the one or more of the seat assembly and the standing platform assembly one or more of laterally about the longitudinal pivot point and longitudinally about the transverse pivot point as the vehicle travels along the travel plane.

10. The method of claim 9, wherein the seat assembly comprises:
a seat structure comprising a seat pan; and
one or more of:
an arcuate lateral slider mechanism disposed in a transverse orientation below and coupled to the seat pan, the arcuate lateral slider member operable for pivoting the seat pan laterally about the longitudinal pivot point; and
an arcuate longitudinal slider mechanism disposed in a longitudinal orientation below and coupled to the seat pan, the arcuate longitudinal slider member operable for pivoting the seat pan longitudinally about the transverse pivot point.

11. The method of claim 9, wherein the standing platform assembly comprises:
a standing platform structure comprising a foot support; and
one or more of:
an arcuate lateral slider mechanism disposed in a transverse orientation below and coupled to the foot support, the arcuate lateral slider member operable for pivoting the foot support laterally about the longitudinal pivot point; and
an arcuate longitudinal slider mechanism disposed in a longitudinal orientation below and coupled to the foot support, the arcuate longitudinal slider member operable for pivoting the foot support longitudinally about the transverse pivot point.

12. The method of claim 9, wherein the one or more of the seat assembly and the standing platform assembly are configured to pivot one or more of laterally and longitudinally within ±17 degrees from a perpendicular plane with respect to the chassis and travel plane.

13. The method of claim 9, wherein the longitudinal pivot point and the transverse pivot point are virtual pivot points.

14. The method of claim 9, wherein the one or more of the seat assembly and the standing platform assembly are configured to pivot one or more of laterally and longitudinally without active assistance.

15. The method of claim 9, wherein the one or more of the seat assembly and the standing platform assembly are configured to pivot one or more of laterally and longitudinally with active assistance of one or more actuation mechanisms coupled to one or more controllers responsive to feedback from one or more sensors.

16. The method of claim 9, wherein the one or more of the seat assembly and the standing platform assembly are configured to pivot one or more of laterally and longitudinally with active assistance of one or more actuation mechanisms coupled to one or more controllers responsive to feedback from one or more cameras.

17. A system for nullifying one or more of lateral and longitudinal acceleration forces experienced by an occupant of a vehicle in a seated or standing position while the vehicle is traveling along a travel plane, the system comprising:
a chassis structure;
an occupant cell one of coupled to and defined by the chassis structure; and
one or more of a seat assembly configured to receive the occupant in a seated position and a standing platform assembly configured to receive the occupant in a standing position disposed within the occupant cell;
wherein the one or more of the seat assembly and the standing platform assembly is/are configured to pivot one or more of:
laterally at a longitudinal pivot point with respect to the chassis and travel plane; and
longitudinally at a transverse pivot point with respect to the chassis and travel plane; and
wherein the one or more of the seat assembly and the standing platform assembly are configured to pivot one or more of laterally and longitudinally with active assistance of one or more actuation mechanisms coupled to one or more controllers responsive to feedback from one or more cameras.

18. The system of claim 17, wherein the seat assembly comprises:
a seat structure comprising a seat pan; and
one or more of:
an arcuate lateral slider mechanism disposed in a transverse orientation below and coupled to the seat pan, the arcuate lateral slider member operable for pivoting the seat pan laterally about the longitudinal pivot point; and
an arcuate longitudinal slider mechanism disposed in a longitudinal orientation below and coupled to the seat pan, the arcuate longitudinal slider member operable for pivoting the seat pan longitudinally about the transverse pivot point.

19. The system of claim 17, wherein the standing platform assembly comprises:
a standing platform structure comprising a foot support; and
one or more of:
an arcuate lateral slider mechanism disposed in a transverse orientation below and coupled to the foot support, the arcuate lateral slider member operable for pivoting the foot support laterally about the longitudinal pivot point; and
an arcuate longitudinal slider mechanism disposed in a longitudinal orientation below and coupled to the foot support, the arcuate longitudinal slider member operable for pivoting the foot support longitudinally about the transverse pivot point.

20. The system of claim 17, wherein the one or more of the seat assembly and the standing platform assembly are configured to pivot one or more of laterally and longitudinally within ±17 degrees from a perpendicular plane with respect to the chassis and travel plane.

* * * * *